United States Patent

Allison

[15] 3,649,042
[45] Mar. 14, 1972

[54] VEHICLE SUSPENSION HAVING AUTOMATIC CORRECTIVE STEERING

[72] Inventor: William D. Allison, Grosse Pointe Farms, Mich.

[73] Assignee: Ford Motor Company, Dearborn, Mich.

[22] Filed: Aug. 5, 1970

[21] Appl. No.: 61,124

Related U.S. Application Data

[63] Continuation of Ser. No. 740,358, June 26, 1968, abandoned.

[52] U.S. Cl. ........................................280/112 A, 180/73
[51] Int. Cl. ..................................................B62d 15/00
[58] Field of Search ..................280/112, 112.1, 124; 180/73

[56] References Cited

UNITED STATES PATENTS

| | | | |
|---|---|---|---|
| 2,279,120 | 4/1942 | Hurley | 280/124 |
| 2,126,642 | 8/1938 | Jones | 280/112.1 |
| 2,341,726 | 2/1944 | Kolbe | 280/112.1 |
| 3,197,233 | 7/1965 | Van Winsen | 280/112.1 |
| 3,448,999 | 6/1969 | Kollander | 280/426 |

*Primary Examiner*—Philip Goodman
*Attorney*—John R. Faulkner and Clifford L. Sadler

[57] ABSTRACT

The rear suspension system for a motor vehicle having a pair of wheels mounted at the outer ends of a rigid axle housing and a pair of suspension arms arranged to position the axle housing with respect to the vehicle frame. The first arm has a fixed pivot on the frame while the second arm is supported from the frame by a bell crank shaped shackle. A control device is constructed to pivot the bell crank and cause the second arm to move longitudinally whereby the axle housing is angularly displaced to assume a corrective steering position. The control device contains an inertia element and is constructed to move the axle housing to an understeer position in response to a centrifugal force.

15 Claims, 3 Drawing Figures

INVENTOR
WILLIAM D. ALLISON
BY John R. Faulkner
Clifford L. Sadler
ATTORNEYS 3,649,042

VEHICLE SUSPENSION HAVING AUTOMATIC CORRECTIVE STEERING

BACKGROUND OF THE INVENTION

This application is a continuation of my earlier filed application, Ser. No. 740,358 filed June 26, 1968 (now abandoned).

Heretofore, the steered direction of the rear wheels on motor vehicles has been mainly a function of the suspension geometry and component deflection resulting from operation of the vehicle. Changes in the rear wheel direction may result from body roll, side forces, road camber, off-center loading, riding height and application of driving and braking torque. Some of these steering effects improve the operation and handling of the vehicle and some are detrimental.

In view of the state of the art, it is the principal object of the present invention to provide a rear suspension system for a motor vehicle having means for automatically angularly displacing the rear wheels and axle in the direction of understeer when the vehicle is subjected to a centrifugal force.

BRIEF SUMMARY OF THE DISCLOSURE

The present invention in its preferred embodiment provides a power operated mechanism for changing the steered direction of the rear wheels. This permits the vehicle direction to be guided in part by a control other than just suspension deflection and motion of the steering linkage. The preferred embodiment provides a power operated bell crank shaped shackle connecting one of the suspension arm pivots to the body. Shifting the arm forwardly or rearwardly by moving the shackle rotates the axle housing about the axle pivot of the opposite arm and thus, changes the steered direction of the rear wheels.

The power means for moving the shackle consists of a hydraulic cylinder interposed between the swinging end of the shackle and a fixed pivot on the frame. A hydraulic valve of the spool type controls the length of the hydraulic cylinder assembly. The valve housing is attached to the shackle and the valve spool is moved by an input signal from an inertia device. Displacement of the valve spool admits oil under pressure to the appropriate end of the cylinder to force the shackle into alignment with the valve spool. Hydraulic pressure may be provided by any conventional pump or reservoir. In the preferred embodiment, the valve spool is moved in response to a side force acting on a weight mounted on a longitudinally extending arm having a vertical pivot axis. A spring is installed to maintain the spool in a central location when not subjected to a side force.

This mechanism will steer the rear axle in a clockwise direction as viewed from above when the vehicle is turning to the right. Centrifugal force will swing the weight toward the left side of the vehicle pulling the spool valve forwardly and thereby admitting oil to the rod end of the power cylinder. This causes the power cylinder to pull the shackle and suspension arm forward. The suspension will follow the movement of the spool valve and steer the axle in proportion to the movement of the input signal.

The angular displacement of the rear axle is in the direction of understeer and thereby greatly improves the handling and stability of the vehicle.

BRIEF DESCRIPTION OF THE DRAWINGS

The many objects and advantages of the present invention will become apparent upon consideration of the following detailed discussion and the accompanying drawings, in which.

DETAILED DESCRIPTION OF THE INVENTION

Figure 1:
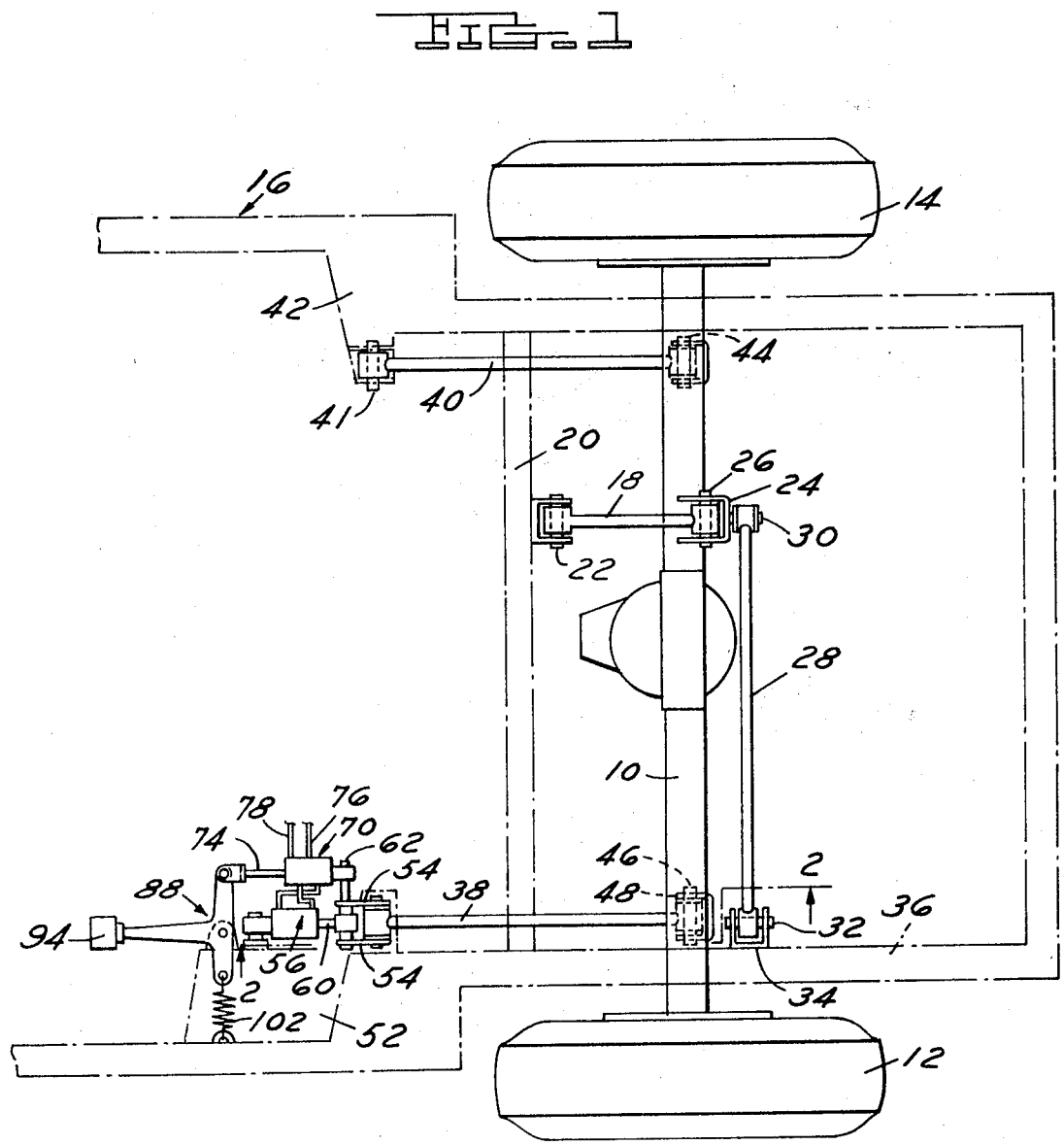
FIG. 1 is a top plan view of a rear suspension system for a motor vehicle constructed in accordance with the present invention.

Referring now to the drawings for a detailed description of the present invention, FIG. 1 discloses a rear suspension system for a motor vehicle. The suspension includes a transversely extending axle housing 10 having left and right road wheels 12 and 14 rotatably mounted at its outer ends. Vehicle support structure in the form of a chassis frame 16 is provided to support the vehicle body (not shown).

Suspension means are provided to connect the axle housing 10 to the frame 16. An upper suspension arm 18 has its forward end connected to a frame component 20 by means of a pivot 22. The rear of the upper arm 18 is pivotally connected at 26 to a bracket 24 that is welded to the axle housing 10. The lateral position of the axle housing 10 is controlled in part by a panhard rod 28 which has its right-hand end pivotally connected at 30 to the axle housing 10. The left-hand end of the rod 28 is pivotally connected at 32 to a bracket 34 welded to the left side rail 36 of the frame 16.

A pair of trailing suspension arms 38 and 40 are also provided to position the axle housing 10. Right-hand arm 40 has its forward end connected by pivot 41 to the structural portion 42 of the frame 16. The rear end of the arm 40 is pivotally connected at 44 to the axle housing 10.

The left arm 38 has its rear end connected by a pivot 46 to a bracket 48 that is welded to the axle housing 10. A bracket 50 is welded to frame portion 52 and pivotally supports a pair of bell cranks 54. The bell cranks 54 pivotally support the left trailing arms 38. A power cylinder 56 has its cylinder part 58 connected to the frame portions 52 and its piston rod part 60 connected by a pivot pin 62 to the bell cranks 54.

The cylinder part 58 has a cylindrical bore and the piston rod part 60 has a piston 64 that slides within the bore. Pressure chambers 66 and 68 are situated within the power cylinder on either side of the piston 64.

A control valve 70 is provided to control the flow of pressure fluid to the power cylinder 56. Valve assembly 70 includes a housing part 72 that is connected to the pivot pin 62 which joins the power cylinder 56 to the bell cranks 54. Valve 70 also has a valve spool 74. An inlet tube 76 brings pressure fluid to the valve 70. An outlet tube 78 conveys pressure fluid from the valve 70 to the sump of a pressure system. The pressure system that connects with the tubes 76 and 78 may be of conventional construction and includes any type of fluid pressure source such as a pump. A tube 80 joins the control valve 70 with the chamber 68 of power cylinder 76. A tube 82 joins the control valve 70 with the chamber 66 of power cylinder 56.

Figure 3:
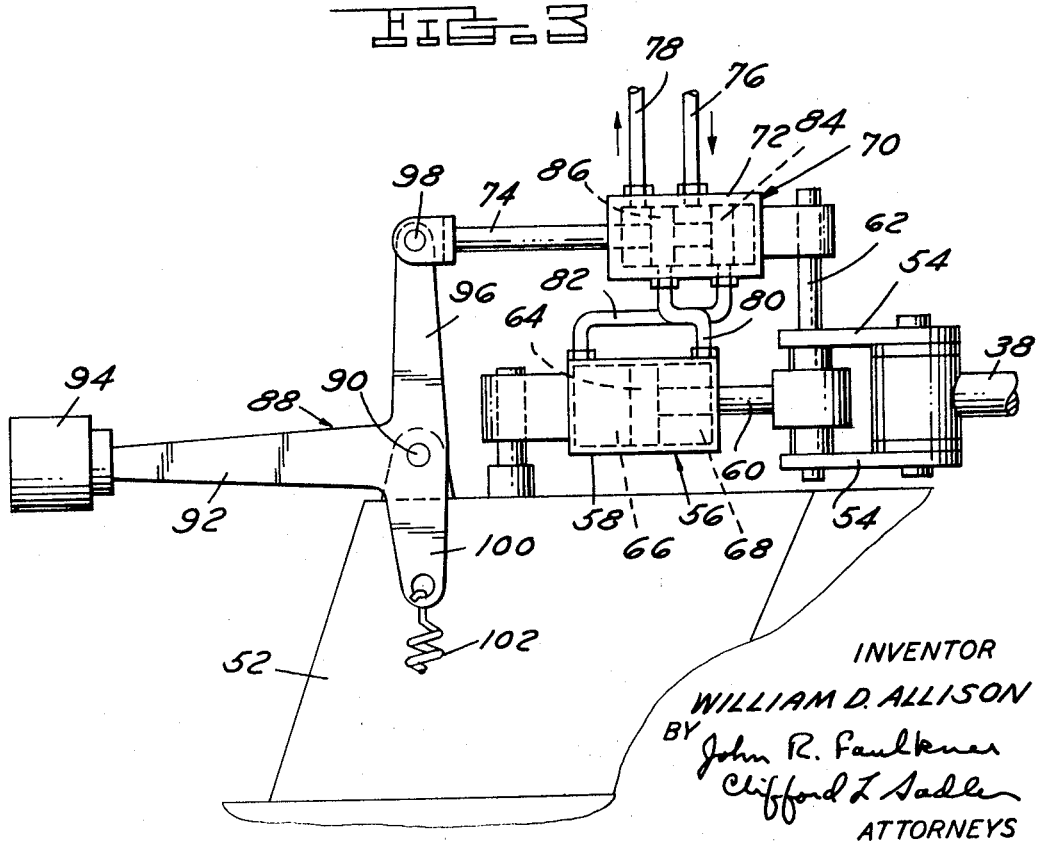
FIG. 3 is an enlarged plan view of the control mechanism of the suspension of FIG. 1.

A pair of valve lands 84 and 86 are situated on the valve spool 74 within the valve housing 72. When the valve lands are centrally arranged as shown in FIG. 3, the ports connected to the tube 80 and 82 are sealed closed and there is no fluid flow. When the valve spool 74 moves to the right, fluid will flow through the inlet tube 76, the valve housing 72, tube 82 and into chamber 66 behind the piston 64. This will cause the power cylinder 56 to increase in length. Similarly, if the spool 74 is moved to the right, pressure fluid will flow through the tube 80 into the chamber 68 and cause the power cylinder 56 to decrease in length.

In accordance with the present invention, inertia means are provided to control the valve 70. A T-shaped lever device 88 is supported on the frame structure 52 by means of a vertically arranged pivot pin 90. The device 88 has a first lever arm 92 that extends longitudinally of the vehicle in a forward direction and has a weight 94 attached to its end. A second arm 96 extends laterally from the pivot 90 and is connected by means of a pivot pin 98 to the end of the valve spool 74. A third lever arm 100 forms a part of the device 88 and has a coil spring 102 connected thereto. The coil spring functions to maintain the device 88 in a central position.

OPERATION

Figure 2:
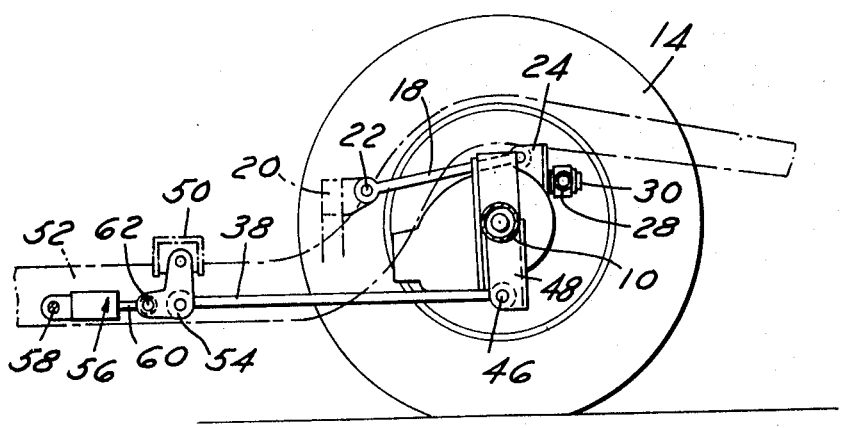
FIG. 2 is a side elevational view of the suspension system of FIG. 1 taken along section lines 2—2.

When a vehicle having a suspension system according to this invention executes a turn, centrifugal force will move the weight 94 to the left or the right in the opposite direction to which the vehicle is turning. By way of example, assume that the vehicle is executing a right-hand turn, the weight 94 will move to the left pivoting the arm 92 about the pin 90 (in FIG. 3 this will correspond to movement of the weight 94 downwardly). Displacement of the weight 94 will cause the lever arm 96 to pivot and thereby move the spool 74 forwardly in the vehicle with respect to the valve housing 72. When this occurs, pressure fluid will pass through the tube 76, valve body 72, tube 80, into the chamber 68. When the chamber 68 is pressurized, the length of the power cylinder will be reduced and (referring to FIG. 2) the bell crank 54 and suspension arm 38 will be drawn forwardly. The axle housing 10 will also be drawn forwardly at its left-hand end and will pivot about the connection 44 between the right arm 40 and the housing 10 (see FIG. 1). Thus, as the vehicle executes a right-hand turn the axle housing and wheels will be canted slightly in a direction tending to cause the vehicle to steer to the left. This is known as providing understeer and greatly enhances the stability and handling properties of the vehicle.

The valve housing 72 is connected to the pivot pin 62 and will move with the piston rod 60 when either chamber 66 or 68 is pressurized. Thus, pressurization of chamber 68 will not only move the bell cranks 54 but it will also move the valve housing 72 in a direction tending to center the valve lands 84, 86 and close off the valve ports connected to the tube 80 and 82. Thus, displacement of the valve spool 74 by means of the inertia weight 94 admits oil under pressure to the opposite end of the power cylinder 56 which, in turn, will force the bell cranks 54 into alignment with the spool 74.

A vehicle turning to the left will cause the corrective steering mechanism of FIG. 3 to operate in a similar but opposite fashion. A left-hand vehicle turn would be accompanied by movement of the inertia weight 94 to the right (upwardly in FIG. 3). The valve spool 74 would move to admit fluid into chamber 66 of power cylinder 56. The cylinder 56 would increase in length and the axle 10 would be canted slightly in a counterclockwise direction as seen in FIG. 1.

An automatic corrective steering mechanism for a rear suspension system constructed in accordance with the present invention would be particularly beneficial in vehicles such as station wagons in which the rear suspension may be more heavily loaded than the front suspension. The additional tire slip angle provided by the servo mechanism would prevent the rear of the vehicle from swinging out as far in a turn and provide more stable handling with less tendency to oversteer. This type of mechanism presents the possibility of converting a basically poor handling vehicle into a good handling vehicle by servo corrections of steering errors imposed by suspension geometry such as panhard rod effects and roll oversteer. The mechanism could also be employed to compensate for the steer effects of road camber and vehicle tilt due to off-center loading.

The foregoing description presents the presently preferred embodiment of the invention. Modifications and alterations may occur to those skilled in the art which will come within the scope and spirit of the following claims.

I claim:

1. A suspension system having automatic corrective steering for a motor vehicle having a wheel,
   a wheel support member rotatably supporting said wheel,
   vehicle support structure,
   wheel positioning means interconnecting said wheel support member and said vehicle support structure,
   automatic steering control mechanism connected to said wheel positioning means and constructed to move said wheel support member and said wheel angularly with respect to said vehicle about a substantially vertical steering axis,
   said automatic control mechanism being constructed to be responsive to a change in attitude of said vehicle.

2. A suspension system having automatic corrective steering for a motor vehicle having a wheel,
   a wheel support member rotatably supporting said wheel,
   vehicle support structure,
   wheel positioning means interconnecting said wheel support member and said vehicle support structure,
   automatic steering control mechanism connected to said wheel positioning means and constructed to move said wheel support member and said wheel angularly with respect to said vehicle about a substantially vertical steering axis,
   said automatic control mechanism being constructed to be responsive to a change in attitude of said vehicle,
   said automatic control mechanism including inertia means responsive to a centrifugal force and constructed to cause the horizontal displacement of said wheel support member.

3. A suspension system having automatic corrective steering for a motor vehicle having a rigid axle housing,
   a pair of wheels mounted at the outer ends of said axle housing,
   vehicle support structure,
   wheel positioning means interconnecting said axle housing and said support structure and constructed to permit said axle housing to traverse a vertical jounce and rebound path with respect to said structure,
   automatic steering control mechanism connected to said wheel positioning means and constructed to move said axle housing angularly with respect to said vehicle about a substantially vertical steering axis,
   said automatic control mechanism being constructed to be responsive to a change in attitude of said vehicle.

4. A suspension system having automatic corrective steering for a motor vehicle having a rigid axle housing,
   a pair of wheels mounted at the outer ends of said axle housing,
   vehicle support structure,
   wheel positioning means interconnecting said axle housing and said support structure and constructed to permit said axle housing to traverse a vertical jounce and rebound path with respect to said structure,
   automatic steering control mechanism connected to said wheel positioning means and constructed to move said axle housing angularly with respect to said vehicle about a substantially vertical steering axis,
   said automatic control mechanism being constructed to be responsive to a change in attitude of said vehicle,
   said automatic control mechanism including inertia means responsive to a centrifugal force and constructed to force the horizontal displacement of said axle housing.

5. A rear suspension system for a motor vehicle having a rigid axle housing,
   a pair of wheels mounted at the outer ends of said axle housing,
   vehicle support structure,
   suspension means interconnecting said axle housing and said support structure and construced to permit said axle housing to traverse a vertical jounce and rebound path with respect to said structure,
   said suspension means comprising a plurality of wheel positioning members,
   one of said members being connected to said axle housing,
   movable means pivotally connecting said one member to said support structure,
   movable means pivotally connecting said one member to said support structure,
   automatic control means connected to said movable means and constructed to move said movable means and said one member longitudinally with respect to said vehicle in response to a change in attitude of said vehicle.

6. A vehicle suspension system according to claim 5 and including:

said control means including inertia means responsive to a centrifugal force acting upon said vehicle and constructed to cause the horizontal displacement of said one member.

7. A vehicle suspension system according to claim 5 and including:
said control means comprising a hydraulic power cylinder connected to said movable means and a control valve constructed to control the flow of hydraulic fluid to one side or the other of said cylinder,
inertia means responsive to a change in direction of said vehicle when it is moving and constructed to actuate said control valve whereby said axle housing is moved in the direction of understeer.

8. A vehicle suspension system according to claim 5 and including:
said wheel positioning members comprising left and right suspension arms,
each of said members being pivotally connected to both said support structure and said axle housing,
said control means comprising a power means and an inertia means connected thereto,
said inertia means being responsive to a change in attitude of said vehicle and constructed to cause said power means to displace said one member.

9. A rear suspension system for a motor vehicle having a rigid axle housing,
a pair of wheels rotatably mounted at the outer ends of said axle housing,
vehicle support structure,
suspension means interconnecting said axle housing and said support structure and constructed to permit said axle housing to traverse a vertical jounce and rebound path with respect to said structure,
said suspension means comprising a pair of wheel positioning members,
pivot means pivotally connecting one of said members to said support structure,
said pivot means having a pivot axis fixed with respect to said support structure,
movable means pivotally connecting the other member to said support structure,
control means connected to said movable means and constructed to move said movable means and said other member longitudinally of said vehicle,
said members normally having a common pivot axis where they are connected to said vehicle support structure.

10. A vehicle suspension system according to claim 9 and including:
said control means including inertia means responsive to a centrifugal force acting upon said vehicle and constructed to cause the horizontal displacement of said other member.

11. A vehicle suspension system according to claim 9 and including:
said control means comprising a hydraulic power cylinder connected to said movable means and a control valve constructed to control the flow of hydraulic fluid to one side or the other of said cylinder,
inertia means responsive to a change in direction of said vehicle when it is moving and constructed to actuate said control valve whereby said axle housing is moved in the direction of understeer.

12. A suspension system having automatic corrective steering for a motor vehicle having a wheel,
a wheel support member rotatably supporting said wheel,
vehicle support structure,
wheel positioning means interconnecting said wheel support member and said vehicle support structure,
automatic steering control mechanism connected to said wheel positioning means and constructed to move said wheel support member and said wheel angularly with respect to said vehicle about a substantially vertical steering axis,
said automatic control mechanism being constructed to be responsive to a change in direction of said vehicle when said vehicle is being driven.

13. A suspension system according to claim 12 and including:
said automatic control mechanism being further constructed to angularly displace said wheel in the direction of understeer.

14. A suspension system having automatic corrective steering for a motor vehicle having a rigid axle housing,
a pair of wheels mounted at the outer ends of said axle housing,
vehicle support structure,
wheel positioning means interconnecting said axle housing and said support structure and constructed to permit said axle housing to traverse a vertical jounce and rebound path with respect to said structure,
automatic steering control mechanism connected to said wheel positioning means and constructed to move said axle housing angularly with respect to said vehicle about a substantially vertical steering axis,
said automatic control mechanism being constructed to be responsive to a change in direction of said vehicle when said vehicle is being driven.

15. A suspension system according to claim 14 and including:
said automatic control mechanism being further constructed to angularly displace said axle housing and said pair of wheels in the direction of understeer.

* * * * *